United States Patent
Remez et al.

(10) Patent No.: US 12,401,535 B2
(45) Date of Patent: Aug. 26, 2025

(54) TOOL, SYSTEM AND METHOD FOR PERFORMING TRANSACTIONS BASED ON A UNIQUE NFT TOKEN

(71) Applicant: Limited Liability Company "SIRIUS-CONSALTING S.R.L.", Chisinau (MD)

(72) Inventors: Oleg Remez, Moscow (RU); Pavel Zhesterov, Moscow (RU)

(73) Assignee: Limited Liability Company "SIRIUS-CONSALTING S.R.L.", Chisinau (MD)

( * ) Notice: Subject to any disclaimer, the term of this patent is extended or adjusted under 35 U.S.C. 154(b) by 46 days.

(21) Appl. No.: 18/417,100

(22) Filed: Jan. 19, 2024

(65) Prior Publication Data
US 2024/0267240 A1    Aug. 8, 2024

(30) Foreign Application Priority Data
Feb. 6, 2023    (RU) .......................... RU2023102626

(51) Int. Cl.
*H04L 9/00*    (2022.01)
*G06V 30/10*    (2022.01)

(52) U.S. Cl.
CPC .............. *H04L 9/50* (2022.05); *G06V 30/10* (2022.01)

(58) Field of Classification Search
None
See application file for complete search history.

(56) References Cited

U.S. PATENT DOCUMENTS

| | | | | |
|---|---|---|---|---|
| 2022/0300950 A1* | 9/2022 | Yakovlev | ................ | G06F 21/31 |
| 2023/0267476 A1* | 8/2023 | Kim | ........................ | G06F 21/64 |
| | | | | 705/39 |

(Continued)

FOREIGN PATENT DOCUMENTS

| CN | 105374105 A | 3/2016 |
|---|---|---|
| CN | 110210857 A | 9/2019 |

(Continued)

OTHER PUBLICATIONS (JSC Raiffeisenbank) What is a virtual card. What is a virtual bank card and how to use it. Feb. 17, 2015. https://web.archive.org/web/20230127171351/https:/www.raiffeisen.ru/wiki/virtualnye-karty/.

*Primary Examiner* — Raqiul A Choudhury
(74) *Attorney, Agent, or Firm* — Perilla Knox & Hildebrandt LLP; Kenneth A. Knox

(57) ABSTRACT

The present disclosure provides a computer-implement method for utilizing a settlement system based on a non-fungible token (NFT), consisting of the original physical banknote and a digital copy of this original physical banknote in the form of an NFT-copy and referred to as an NFT-banknote, so as to perform a settlement electronically using a blockchain or other service. The method includes: obtaining digital images of the original physical banknote; checking, whether the digital images of the original physical banknote meet the predetermined requirements, and verifying the authenticity of the original physical banknote. An NFT-token is issued, which includes digital images of the specified banknote as well as data regarding the currency of the banknote, nominal value of the banknote, the current owner of the settlement system, and the current holder of the original physical banknote, and then the data about the obtained settlement system is entered into the register.

10 Claims, 3 Drawing Sheets

(56) References Cited

U.S. PATENT DOCUMENTS

2024/0113881 A1\* 4/2024 Johar ................ H04L 9/0825
2024/0281796 A1\* 8/2024 Finlow-Bates ...... G06Q 20/405

FOREIGN PATENT DOCUMENTS

RU 2005130146 A 4/2007
WO 2022229144 A1 11/2022

\* cited by examiner

TOOL, SYSTEM AND METHOD FOR PERFORMING TRANSACTIONS BASED ON A UNIQUE NFT TOKEN

CROSS-REFERENCE TO RELATED APPLICATIONS

This application claims the benefit of and priority to Russian Federation Patent Application No. 2023102626 filed Feb. 6, 2023, the contents of which being incorporated by reference in their entirety herein.

TECHNICAL FIELD

This disclosure relates to tools, systems, and methods for accomplishing events using non-fungible tokens (NFTs) and a settlement system, and further relates to blockchain technology.

BACKGROUND

Currently, the most common settlement tools all over the world are banknotes, which are monetary units issued by central banks of respective countries and made of special types of paper and/or plastic. Banknotes have a nominal value, which is the notional amount of the banknote expressed in monetary units of the national currency. To protect the banknotes from counterfeiting, they are provided with security features, such as watermarks, complex graphic images, and unique alphanumeric codes, etc.

Banknotes are convenient and familiar to users both as currency and means for saving. In general, people prefer to keep their savings in banknotes of one or another currency, and store them in a readily accessible place. This is especially evident under conditions of economic instability, when confidence in the banking system as a whole and the ability to store savings in the form of deposits "somewhere on a bank account" rather than at hand, declines. In addition, using banknotes does not require additional technical means, and it is enough just to exchange a banknote for a desired good. At the same time, monetary resources used as savings are substantially withdrawn from circulation. The amount of such monetary resources cannot always be estimated; besides, cash transactions are non-transparent to regulatory authorities, at least up to a certain amount. These factors also enhance the confidence in banknotes and the right to use them as currency.

Cryptocurrencies can be an alternative to traditional banknotes in national currencies. However, cryptocurrencies are based on a technology that is quite sophisticated for an ordinary user to understand. In addition, using cryptocurrencies requires special technical means (a software-hardware complex, such as a computer or smartphone consuming electricity and having access to the Internet). Furthermore, a legal framework for cryptocurrencies is still being developed, and their use under certain circumstances may be illegal.

On one hand, it is beneficial for the regulatory authorities of any state to control the entire mass of cash and each transaction. On the other hand, attempts to ban cash circulation can lead to serious social destabilization.

Therefore, the technical problem is to put banknotes kept by population into circulation and to increase transparency of transactions, while not banning the cash circulation as such.

A bill of exchange is a widely known instrument that gives its holder the right to obtain the agreed amount of money from the bill issuer (debtor). A bill of exchange allows its holder to transfer the right to claim a debt to a third party (drawee). Thus, a bill of exchange substantially has the functions of money as a means of circulation. However, a bill of exchange only contains the amount of money to be claimed, but does not contain a requirement that the bill issuer is obliged to pay the bill holder in specific banknotes. Besides, a bill of exchange does not contain any data of the banknote details.

A method for performing transactions in the related art includes a non-fungible or unique token (NFT, "non-fungible token") linked to a physical banknote that is created for this banknote. The NFTs obtained can then be traded ("Trigometric Launches NumisArt, the World's First Numismatic NFT Trading Platform", published online at: https://www.taiwannews.com.tw/en/news/4655952, accessed 11.10.2022). In this case, after buying the NFT for this banknote, the banknote itself is also sent to a new owner. In this technical solution, the NFT is not a settlement system, and the banknote itself is a collectible item.

BRIEF SUMMARY

The above problem is solved and the claimed technical results are achieved by a method for creating and utilizing a settlement system (e.g., a payment tool) based on a non-fungible token (NFT), consisting of an original physical banknote and a digital copy of this original physical banknote in the form of an NFT-copy and referred to as an NFT-banknote, in order to perform various events including, but not limited to, settlement transactions (e.g., financial remittance among other settlements). The method includes obtaining digital images of the original physical banknote; and verifying whether the digital images of the original physical banknote meet predetermined requirements, and if yes, verifying the authenticity of the original physical banknote. If it is verified that the original physical banknote is an authentic one an NFT-token is programmatically issued by a service, such as a remotely hosted service accessible via one or more application programming interface (API) calls, that includes digital images of the specified banknote as well as the data regarding the currency of the banknote, the nominal value of the banknote, the current owner of this settlement system (e.g., a system administrator), and the current holder of the original banknote, and then the data about the settlement system obtained may be entered into the register of NFT-banknotes.

The above problem is solved and the claimed technical results are achieved by this or another aspect of the present disclosure, such as by using a settlement system, hereinafter also referred to as a NFT-banknote that includes two components: an original physical banknote; and a digital copy of this original physical banknote generated as an NFT-token according to the claimed method. The specified digital copy, hereinafter referred to as an NFT-copy, is used to perform settlements in blockchain networks when making transactions of any kind, such as the purchase and sale of goods and/or services, wherein the original physical banknote may be only transferred at the request of a person who receives the specified settlement system upon completion of the transaction.

The above problem is solved and the claimed technical results are also achieved by still another aspect of the present disclosure, i.e. by a method for performing settlement events using a specified NFT-banknote, where an NFT-copy of the original physical banknote is sent to an individual (e.g., a seller) in exchange for the goods, wherein the fact of completion of a transaction is identified by replacing the record of the current owner of this NFT-banknote by that of the individual in the NFT. The original physical banknote may then be claimed and transferred from the holder to the owner at the request of a new owner of the NFT-banknote. This is accompanied by changing the record of the holder in the NFT.

Hereafter, other possible embodiments of the present disclosure are described in more detail with reference to the figures, but the present disclosure is not limited to such embodiments.

DETAILED DESCRIPTION

At least one objective of the present disclosure is to put banknotes kept by population into circulation without removing their physical originals.

Figure 1:
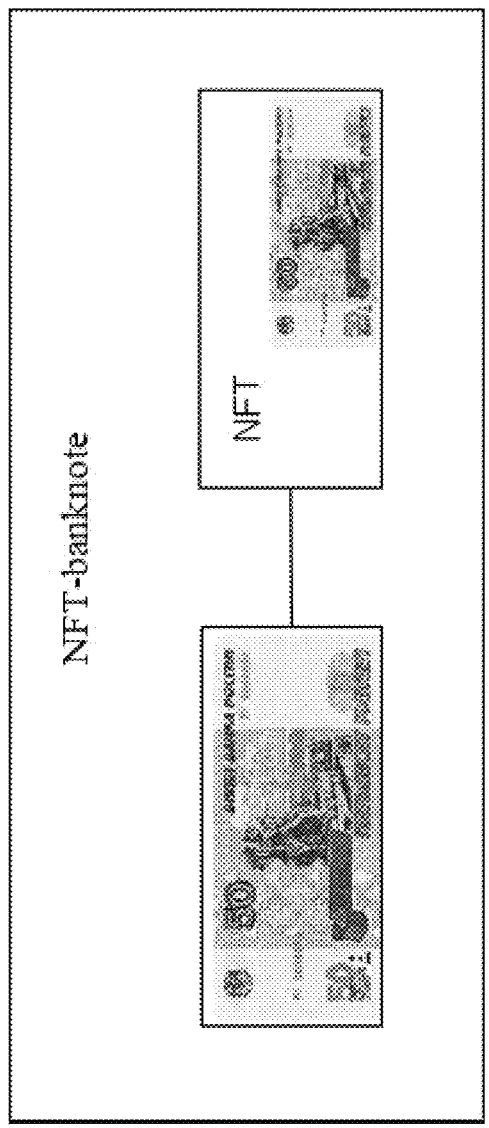
FIG. 1 shows the structure of the settlement system according to the present disclosure.

The technical results achieved by implementation of the present disclosure are as follows:

Reducing resources for maintaining repositories to store cash;

Extending the circulation period of banknotes, and consequently, reducing resources to be allocated for the production of banknotes and reducing the environmentally harmful amount of banknotes to be withdrawn from circulation; and Eliminating anonymity of possession, usage, and disposal of banknotes while maintaining banknotes as a settlement system. To solve the above problem and to achieve the claimed technical results the present disclosure provides for a settlement system, the structure of which is shown in FIG. 1.

The proposed settlement system, hereinafter referred to as an NFT-banknote, includes the following two components: the original physical banknote and an NFT-copy of the original physical banknote.

The original physical banknote should be understood as an original copy of a banknote issued by a central bank of a state. The original physical banknote is characterized by attributes that include the banknote identification factors, the banknote authenticity factors, and the banknote ownership factors.

The identification factors of the original physical banknote may include the nominal value of the banknote; currency of the banknote; geometric dimensions of the banknote; embossments to indicate the nominal value for use by blind and visually impaired people; graphic images corresponding to the standard banknote of a given nominal value of a given currency; other identification factors that will be obvious for those skilled in the art based on the requirements specified by the governmental authorities for banknotes of a given state.

The authenticity factors of the original physical banknote may include its unique alphanumeric identifier; color and location of graphic images printed on the banknote; shape and location of the watermarks; presence of a security thread embedded into the banknote material; how perfectly the banknote graphic images coincide when viewed against the light; color, shape and location of graphic images when exposed to ultraviolet radiation and/or infrared radiation; unique arrangement of fluorescent fibers, unique arrangement of scuffs, kinks, tears, shadows inherent in a particular banknote; shape and location of other means of protection; and other authenticity factors that will be obvious to a person skilled in the art based on the requirements of the governmental authorities for banknotes of a given state.

The ownership factors include identifiers of a person who is the holder of a given banknote, which are not a priori inherent in this banknote; identifier of the banknote location; identifier of the time period during which the banknote was in a given location; etc.

An NFT-copy of a given original physical banknote is a non-fungible, or unique, token that includes digital images of at least both sides of the banknote, as well as information about the attribute values of the original physical banknote. In addition, the NFT-copy has its own attributes intended to verify whether the digital images included in the token meet the predefined requirements, as well as to verify whether the original physical banknote is authentic. These attributes can also include information about persons who are entitled to dispose of this digital copy, and information about the NFT-copy manufacturer, etc.

In the process of concluding transactions, an NFT-copy is transferred to an individual (e.g., a seller) or a service provider. Having received an NFT-copy for its goods or services, the individual becomes entitled to claim the original physical banknote from a person who is the holder of the original physical banknote.

Figure 2:
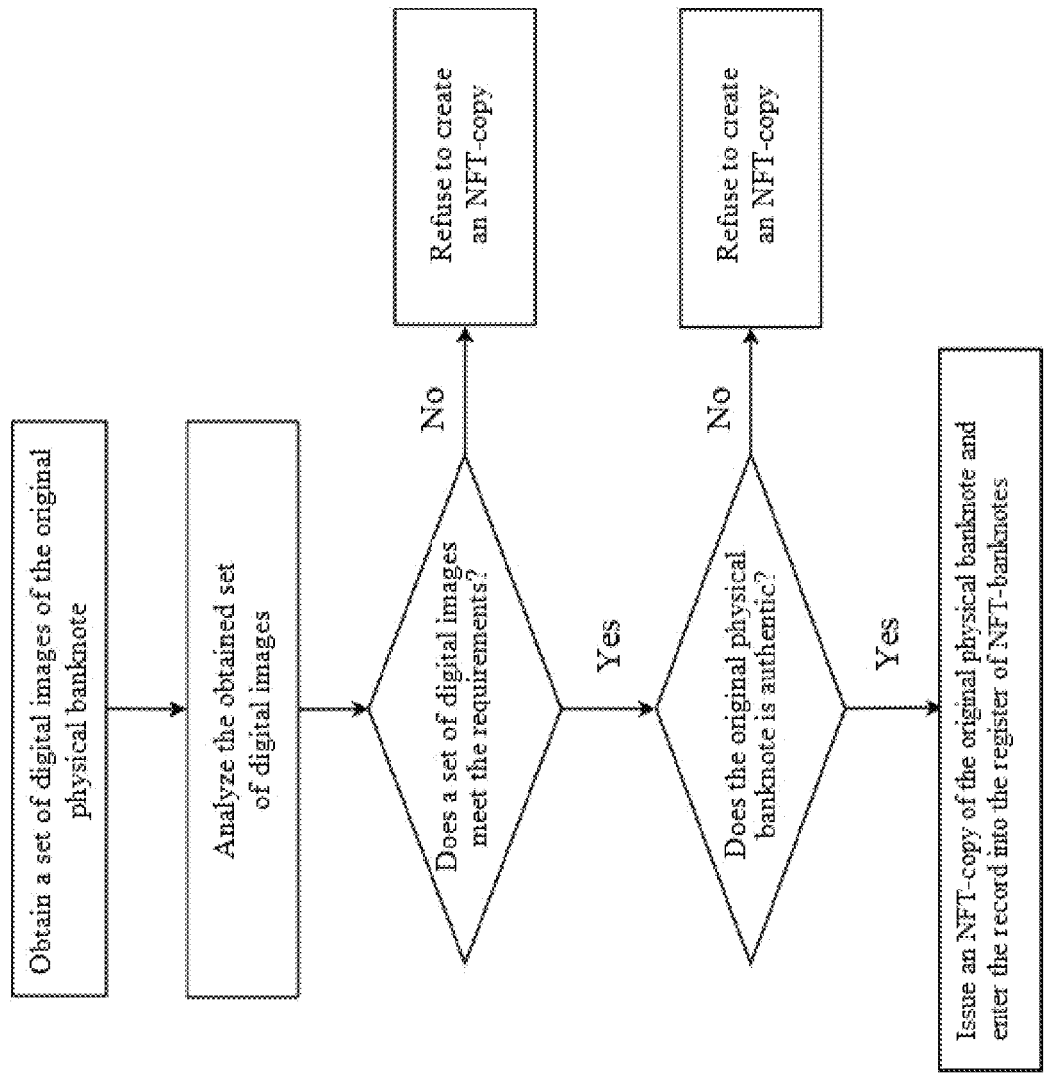
FIG. 2 shows the main steps of a computer-implemented method for implementing the settlement system including the original physical banknote and the NFT-based digital copy of this original physical banknote, so as to perform settlements.

To create a settlement system, including an original physical banknote and NFT-based digital copy of this original physical banknote in order to perform settlements or transactions, a method is proposed, the basic steps of which are shown in FIG. 2.

At the first step, an original physical banknote is provided as a basis for receiving a settlement system in accordance with the claimed method.

At the second step, a set of digital images of the original physical banknote is obtained for each of the two sides of the specified banknote.

A digital image of the original physical banknote is obtained, for example, by photographing, scanning, video recording of the original banknote by various means of image acquisition, for example, using a camera, video camera, web-camera, scanner, camera built into a smartphone, etc.

The specified set of digital images shall include at least three images for each of the two sides of the banknote, obtained from the following perspectives: an image obtained when viewed against the light; an image obtained at an angle of 90° to the plane of the banknote; an image obtained at an acute angle to the plane of the banknote.

In addition, an image obtained when the banknote is back-lit by UV radiation from a UV-radiation source and/or an image obtained when the banknote is back-lit by IR radiation from an IR-radiation source shall be preferably added to the set of digital images. The resulting set of images makes it possible to identify the banknote identification factors and the banknote authenticity factors. Subsequent analysis of the resulting set of images that meet the requirements enables to verify the authenticity.

Parameters of each digital image include at least two parameters, one of which is the image acquisition date and time. At least one other parameter is selected from the group including: image resolution; image color depth; contrast; brightness; identifier of the image acquisition location, for example, in the form of geographic coordinates of the shooting location; author of the image; mark and model of the image-capturing device; the scene location at the moment of the image acquisition; presence or absence of the image background; absence of glares or other artifacts hindering the image identification; etc. The ranges of image parameters shall be determined in advance.

At the third step, the resulting set of images of the original physical banknote is analyzed so as to verify that the resulting set of digital images meets the predetermined requirements.

If compliance with the requirements is verified, i.e. if it is determined that the number of digital images of the original physical banknote in the set of digital images, their angles and parameters of each of the digital images meet the specified requirements, a transition to the fourth step is performed.

If it is determined that the set of digital images does not meet the specified requirements, an issue of an NFT-copy of this original physical banknote is cancelled.

At the fourth step, the authenticity of the original physical banknote is analyzed based on the available set of digital images of this original physical banknote.

If it is determined that the combination of authenticity factors in all images of the set of digital images of the original physical banknote corresponds to the list of the authenticity factors published by the bank emitting the original physical banknote, it is concluded that the original physical banknote is authentic, and a transition to the fourth step is performed.

If it is determined that the original physical banknote is not authentic, an issue of an NFT-copy of this original physical banknote is cancelled.

At the fourth step, an NFT-copy of the original physical banknote is issued, and a corresponding record is entered into the register of NFT-banknotes.

In such a case, all digital images from the set of digital images verified at the third step are included into the token. In addition the token includes the ownership factors of the original physical banknote, as well as other attributes. The specified NFT can be generated based on one of the ERC-721, ERC-721R, ERC-1155 standards or any other NFT-generation algorithm.

Figure 3:
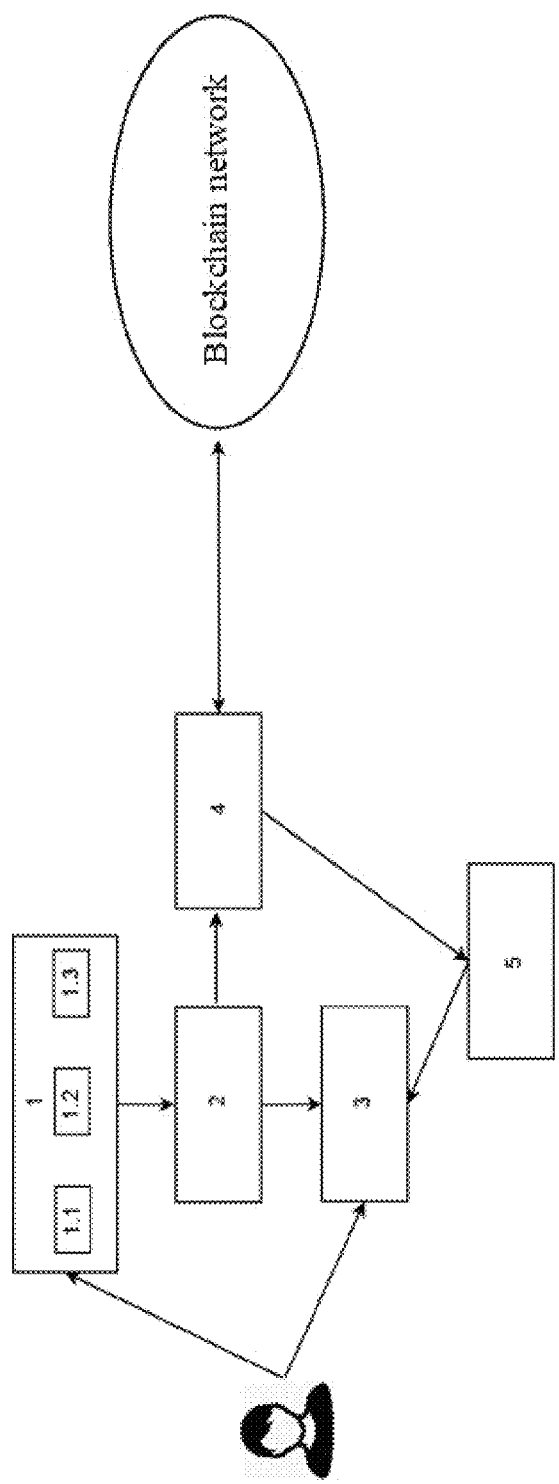
FIG. 3 schematically shows the main components of the system.

The claimed method for creating an NFT-banknote is implemented through a system for creating and managing NFT-banknotes, the main components of which are shown in FIG. 3.

The system is a software-hardware complex, and it includes: digital image acquisition unit (1); digital image evaluation unit (2); user recordation unit (3); unit (4) for generating an NFT-copy of the original physical banknote; and NFT-banknote recordation unit (5).

The digital image acquisition unit (1) is intended to acquire digital images of the original physical banknote according to the specified requirements. The digital image acquisition unit (1) includes a digital image generation module (1.1), an illumination module (1.2), and a digital image recording and storage module (1.3).

The module (1.1) includes a digital image generation tool, for example, a camera, video camera, scanner, web-camera, or mobile device camera.

The module (1.2) includes at least one illuminating component to be selected from the group including: ultraviolet irradiation source, visible irradiation source, and infrared irradiation source.

The module (1.3) includes a means for registering and storing digital images, and it can be implemented in the form of a database, wherein the information to be stored therein is available from the data storage medium. The data storage medium includes at least one of the following: HDD, SDD, flash memory, RAID array, cloud storage system.

Optionally, the modules (1.1) and (1.2) can be placed within a separate block (1') to enable remote acquisition of digital images.

The digital image evaluation unit (2) is configured to evaluate whether the parameters of digital images meet the predetermined requirements, as well as to determine the authenticity factors of the original physical banknote. The digital image evaluation unit (2) includes: an analysis module (2.1) that can be implemented as a processor; and a memory module (2.2), where the values representing the requirements to digital images are located including the list and descriptions of the identification factors and authenticity factors of the original physical banknote. The digital image evaluation unit (2) is configured to determine whether the original physical banknote is authentic.

The user recordation unit (3) includes means for registering and storing data of the system users, including their identification data, information about their roles in the system, and information about NFT-banknotes associated with a given user.

The unit (4) for generating an NFT-copy of the original physical banknote is configured to generate a set of data to be directed to the blockchain networks so as to create an NFT-copy of the original physical banknote, wherein the set of data includes all digital images from the set of verified digital images. In addition, the token includes the ownership factors of the original physical banknote, as well as other attributes of the NFT-banknote. The specified set of data is directed by the unit (4) to the blockchain network so as to create an NFT-copy of the original physical banknote. After receiving a token created in the blockchain network, the unit (5) transmits information about it to the NFT-banknote recordation unit (5).

The NFT-banknote recordation unit (5) is intended to accumulate data on the NFT-banknotes so as to register the NFT-banknotes.

Three roles are provided for operation of the system, they are: Owner, Holder, and Administrator, and each of these roles has a set of rights and responsibilities.

The Owner is a person who is entitled to dispose of and use the claimed settlement system, or an NFT-banknote, i.e. both the physical original banknote and an NFT-copy of this original physical banknote created as a digital copy of the physical original banknote. The Owner is entitled to claim the original physical banknote. Upon receiving the original physical banknote, the Owner becomes a Holder. The Owner may continue to act as a Holder, or transfer the original physical banknote for safekeeping to another person, whose data is entered into the register of NFT-banknotes, as well as into the NFT-copy of this banknote. A change of the Owner is registered by entering a corresponding record into the register of users of the system, into the register of NFT-banknotes, as well as into the NFT-copy of this banknote. A change of the Owner occurs if the banknote is accepted as a settlement system in exchange for a good, service, or at the request of the current Owner of the banknote in the event of its alienation in any other legal way.

The Holder is a person who holds the original physical banknote having its digital NFT-copy. It is the responsibility of the Holder to physically preserve the original banknote. The Holder is prohibited from using the original physical banknote without permission of the banknote Owner to avoid double use of the same banknote. The Holder is obliged to provide a digital image of the banknote to the Administrator and/or the Owner at least once within a pre-agreed time period. A person acting as the Holder may be provided with a remuneration paid by the Owner and/or the Administrator for performing the functions of the Holder. A change of the Holder occurs when the Holder has claimed the original physical banknote from the current Holder. In this case, the data about a new Holder is entered into the register of banknote holders, as well as into the NFT-copy of this banknote.

Before an NFT-copy of the original physical banknote is generated, the roles of the Holder and the Owner are not defined, and a person having the original physical banknote is the banknote Holder. After a digital copy of the original banknote is generated, the roles of the Holder and the Owner of this banknote crop up, wherein these roles can be assigned, but not necessarily, to different persons.

Administrator is a person who, in response to a request from the banknote holder, generates an NFT-banknote that includes data about the current Holder and the Owner of the banknote. In addition, the Administrator maintains a register of the system users, a register of the NFT-banknotes, making timely changes according to the changes of data about the Holder and the Owner of a given banknote. The Administrator verifies the authenticity of the banknote before generating its NFT-copy. The Administrator connects to the blockchain network in which NFT-banknotes are circulated and registers the transfer of rights to the NFT-banknotes according to the change in roles of persons who use the circulation of the NFT-banknotes.

Thus, the Holder is substantially responsible only for a part of the settlement system, namely for the original physical banknote. The owner is entitled to possess, use and dispose of both components of the settlement system, namely the original physical banknote and its digital NFT-copy. The operator records and registers all the NFT-banknotes, as well as their Holders and Owners, respectively.

The image-capturing device may be at disposal of a person who is the holder of the original physical banknote. In this case, such a person receives a digital image of the original physical banknote in accordance with the requirements for the image. Further, the resulting image is sent to the Administrator using well-known wired and/or wireless communication methods.

Optionally, the image-capturing device may be at disposal of the Administrator. In this case, a person who is the holder of the original physical banknote provides the Administrator with the original physical banknote to generate a set of its digital images.

In addition, a person who is the holder of the original physical banknote provides the Administrator with some data necessary for his/her identification. Such data may include, for example, first name, patronymic and last name; series and number of the identity document; driver's license number; phone number; etc.

When a person who is the holder of the original physical banknote accesses the system for the first time, the Administrator registers him/her in the system by assigning a unique number, and also provides a login and password for interaction through the system interface. The specified data are stored in the system register implemented using known methods in the form of a database. To store the data of the specified database, well-known data storage media are used, for example, hard disk (HDD, SDD), hard disk arrays, cloud data storage systems, etc.

During the subsequent access in the system, the identity of the person shall be verified.

The Administrator then verifies the authenticity of banknotes, for which purpose the resulting digital image of the original physical banknote is sent by the Administrator to the authentication facility. The authentication process includes comparing the parameters, characterizing the authenticity of banknotes (authenticity factors), of the banknote digital image with those of the physical original and/or standard of a banknote of a given nominal value. In particular, if a list of original physical banknotes withdrawn from circulation by the central bank or compromised as counterfeit ones is available, a unique alphanumeric identifier of a banknote on its digital image can be compared with those known from the specified list.

Upon confirmation that the digital image of a banknote corresponds to its original, as well as that the original banknote is valid, the Administrator enters a corresponding record into the register located in the database. The record comprises at least the following attributes:
  unique alphanumeric identifier of the original physical banknote;
  nominal value of the original physical banknote;
  digital image file of this original physical banknote;
  file name;
  file receipt date;
  unique number of a person who sent the digital image file of this original physical banknote;
  role of a specified person (Owner, Holder).

Thus, a person who sent the digital image file of the physical original of a given banknote is assigned as the Holder if the specified person holds the original physical banknote, and as the Owner if the specified person has expressed the intention to become the Owner of the NFT-banknote. Certainly, the Owner may also optionally act as the Holder of the NFT-banknote.

Subsequently, the Administrator generates an NFT-token that includes all the above attributes.

The resulting NFT is used by the Owner as a tool for making settlements or transactions in the relevant blockchain networks. So, for example, if any product or service can be paid by NFT-tokens, the Owner sends NFT-copies of the original physical banknotes to the individual or to the service provider as consideration for the product or service, wherein said NFT-copies are presented in such quantities that the sum of the nominal values corresponds to the price of the product and/or service. The product or service acquisition is considered completed when the Administrator enters appropriate changes into the register indicating that the Owner of the banknote is changed. In this case, the purchaser of the product or service loses the role of the Owner, and the individual (e.g., product seller) or service provider becomes the new Owner of the NFT-banknote and is entitled to claim the original physical banknote from the Holder.

In the event that the verification of authenticity of the banknote is unsuccessful, the Administrator sends a notification that the verification of authenticity of the banknote has failed to a person, who is the holder of the original physical banknote, and in the event that the NFT-banknote has already been issued—to the Holder and the Owner of the banknote. In this case, an NFT-token is not issued, and if an NFT-copy has already been issued, it is withdrawn from circulation. In this case, the Administrator compensates the Owner of this banknote for the cost in the amount of the nominal value of the specified banknote. Accordingly, when such an NFT-banknote is withdrawn from circulation, the Administrator enters corresponding changes into the register and excludes data about the Holder and the Owner of the banknote from the register.

If the original physical banknote is destroyed, its existing NFT-copy is not withdrawn from circulation, since there is no risk of creating a duplicate NFT-copy due to the absence of the original banknote. However, in this case, when sending the Owner's request to receive the original physical banknote, the Administrator compensates the banknote Owner for the cost in the amount of the nominal value of the specified banknote. Accordingly, for an NFT-banknote, the physical original of which has been lost, the Administrator enters corresponding changes into the register and excludes data about the Holder of the banknote from the register.

The system interface can be implemented in the form of a mobile application and/or website. A person who is the holder of a physical banknote and wishes to become the Holder and/or Owner of an NFT-banknote contacts the Operator by registering on the website and/or in the mobile application. In this case, the specified person transmits to the Administrator an appropriate information comprising at least one of the items from the group including: identifier of a specified person (last name, first name, patronymic; TIN (Individual Taxpayer Identification Number), OGRN (Primary National Registration Number)); biometric data of a specified person; registration address of a specified person; telephone number; email address of a specified person; ID number; driver's license number. Further authorization of the specified person in the system is performed using the obtained login and password, or using the biometric data.

The website and/or mobile application provide a registered person with the functions of a personal account in the claimed system.

Any personal account includes the following information, which is updated by the Administrator:
Identification data of a person;
Role(s) of a person;
List of NFT-banknotes, a Holder of which is the specified person, and their status;
List of NFT-banknotes, an Owner of which is the specified person, and their status.
NFT-banknotes can have the following statuses:
valid;
verification of authenticity required;
original physical banknote lost;
NFT-banknote withdrawn.

At the same time, for each of NFT-banknotes, information about its nominal value and other parameters is indicated. The personal account also provides access to a digital image of each of the banknotes, the Holder or Owner of which is a specified person. For NFT-banknotes, the Holder of which is a specified person, a date is indicated by which the next digital image of the banknote shall be provided so as to verify the integrity of the settlement system.

A person logged in to the system interacts with the Administrator through his/her personal account by sending requests on relevant issues.

The Administrator interacts with a person logged in to the system through his/her personal account by responding to requests or initiating requests.

Registration may be terminated at the request of a person logged in the system, and the Administrator sends a reward to the specified person in an amount equivalent to the sum of nominal value of NFT-banknotes, the Owner or Holder of which is a specified person, and the original banknotes are transferred to the Administrator.

Thus, when implementing the described embodiments it is possible to reduce the resources for maintaining repositories to store cash due to the fact that banknotes are stored distributed among the banknote Holders. Since the original banknotes are not physically used for transactions, their circulation period is extended, and consequently, resources for the production of banknotes are reduced, and the environmentally harmful amount of cash in the form of banknotes to be withdrawn from circulation is reduced. Since registration in the system and further interaction requires personal data, anonymous ownership, usage and disposal of cash in the form of banknotes is eliminated, while cash in the form of banknotes may still be used as a settlement system.

Therefore, the following is claimed:

1. A computer-implemented method for utilizing a settlement system based on a non-fungible token (NFT), comprising:
obtaining digital images of an original physical banknote;
determining, whether the digital images of the original physical banknote meets predetermined requirements and, if it is determined that the specified digital images meet the predetermined requirements:
verifying authenticity of the original physical banknote by comparing banknote authenticity factors indicated on the digital images of the banknote with predetermined banknote authenticity factors;
if it is verified that the original physical banknote is an authentic one, issuing an NFT-token that includes digital images of the original physical banknote as well as data regarding a currency of the banknote, a nominal value of the banknote, a system administrator of the settlement system, and a current holder of the original physical banknote; and
entering data about the received settlement system into a register of NFT-banknotes.

2. The computer-implemented method according to claim 1, wherein, in an event of changing the current owner of an NFT-banknote, an appropriate record in the register of NFT-banknotes is adjusted by entering data about a new owner into a corresponding NFT-token.

3. The computer-implemented method according to claim 1, wherein, in an event of changing the holder of the original physical banknote, an appropriate record in the register of NFT-banknotes is adjusted by entering data about a new holder of the original physical banknote into the corresponding NFT-token.

4. The computer-implemented method according to claim 1, wherein, to verify whether the original physical banknote is authentic, at least one of the authenticity factors is used that is selected from a group including: a unique alphanumeric identifier of the banknote; a graphic image printed on the banknote; presence and unique arrangement of multi-colored fibers, unique arrangement of scuffs, kinks, tears, and shadows inherent in a particular banknote.

5. The computer-implemented method according to claim 1, wherein the nominal value of the payment tool is set corresponding to the nominal value of the original physical banknote.

6. A settlement system based on a non-fungible token (NFT), comprising:
one or more hardware processors and a memory storing program instructions executable by the at least one or more hardware processors that, when executed, direct the one or more hardware processors to:

obtain digital images of an original physical banknote to generate a digital copy of the original physical banknote;

determine, whether the digital images of the original physical banknote meets predetermined requirements and, if it is determined that the specified digital images meet the predetermined requirements:

verify authenticity of the original physical banknote by comparing banknote authenticity factors indicated on the digital images of the banknote with predetermined banknote authenticity factors;

if it is verified that the original physical banknote is an authentic one, issue an NFT-token that includes digital images of the original physical banknote as well as data regarding a currency of the banknote, a nominal value of the banknote, a system administrator of the settlement system, and a current holder of the original physical banknote; and enter data about the received settlement system into a register of NFT-banknotes.

7. The system according to claim 6, wherein the digital copy of the original physical banknote based on the non-fungible token (NFT) is transmitted to a party in association with a settlement event, wherein the settlement event is determined to be completed when a record about an owner in a register of NFT-banknotes is changed by replacing data of a current owner by that of the party.

8. The system according to claim 7, wherein the original physical banknote is transferred from a holder to the owner at the request of a system administrator.

9. The system according to claim 8, wherein an appropriate record in the register of NFT-banknotes is changed when the original physical banknote is transferred from the holder to the system administrator, which is accomplished by entering data, indicating that the owner of the payment tool becomes a new holder of the original physical banknote, into the corresponding NFT-token.

10. The system according to claim 9, further comprising verifying an integrity of the settlement system, which includes providing digital images of the original physical banknote at predetermined time intervals.

* * * * *